(12) United States Patent
Terakado et al.

(10) Patent No.: US 9,059,607 B2
(45) Date of Patent: Jun. 16, 2015

(54) GEAR-INTEGRATED ELECTRIC MOTOR AND ELECTRIC VEHICLE

(75) Inventors: Shuichi Terakado, Mito (JP); Hideaki Mori, Kasumigaura (JP); Yutaka Matsunobu, Mito (JP); Satoshi Yamamura, Naka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 408 days.

(21) Appl. No.: 13/638,406

(22) PCT Filed: Mar. 31, 2011

(86) PCT No.: PCT/JP2011/058273
§ 371 (c)(1),
(2), (4) Date: Nov. 2, 2012

(87) PCT Pub. No.: WO2011/125864
PCT Pub. Date: Oct. 13, 2011

(65) Prior Publication Data
US 2013/0049497 A1 Feb. 28, 2013

(30) Foreign Application Priority Data

Apr. 1, 2010 (JP) .................................. 2010-085120

(51) Int. Cl.
*H02K 9/20* (2006.01)
*H02K 7/00* (2006.01)
*H02K 7/116* (2006.01)

(52) U.S. Cl.
CPC ................ *H02K 7/006* (2013.01); *H02K 7/116* (2013.01); *H02K 9/20* (2013.01); *Y02T 10/641* (2013.01)

(58) Field of Classification Search
None
See application file for complete search history.

(56) References Cited

U.S. PATENT DOCUMENTS

| 6,129,193 | A | * | 10/2000 | Link | 192/84.1 |
| 2008/0067882 | A1 | * | 3/2008 | Murata | 310/54 |
| 2012/0133222 | A1 | * | 5/2012 | Han et al. | 310/58 |

FOREIGN PATENT DOCUMENTS

| JP | 2004-050990 A | 2/2004 |
| JP | 2005-130554 A | 5/2005 |
| JP | 2008-125172 A | 5/2008 |

* cited by examiner

*Primary Examiner* — Tran Nguyen
(74) *Attorney, Agent, or Firm* — Volpe and Koenig, P.C.

(57) ABSTRACT

A gear-integrated electric motor is provided with a motor (1) generating a driving force by input of electricity, a gear mechanism (2) converting the driving force of the motor, and a housing (8) containing the motor and the gear mechanism, and used in a horizontal position in which a motor shaft (1s) and a gear output shaft (2s) become substantially horizontal. The gear-integrated electric motor includes at least one heat pipe (3) which has an evaporation portion (3e) disposed in a motor area of the housing, and a condensation portion (3c) disposed in a gear mechanism area of the housing and higher than the evaporation portion with respect to the vertical direction in the horizontal position.

8 Claims, 13 Drawing Sheets

GEAR-INTEGRATED ELECTRIC MOTOR AND ELECTRIC VEHICLE

TECHNICAL FIELD

The present invention relates to a gear-integrated electric motor which includes a gear mechanism and a motor main body within a housing, and an electric vehicle including this gear-integrated electric motor.

BACKGROUND ART

An electric motor included as a driving source in a mobile body such as a hybrid-type electric vehicle (HEV), an electric vehicle (EV), and an electric railroad vehicle is required to have both advantages of compactness and lightness and of high output. Generally, there is a close relationship between the size of the motor and the cooling efficiency of the motor. When the cooling efficiency of the motor improves, the output of the motor in the same size rises. Thus, various methods for improving the cooling efficiency have been developed such as addition of fins, addition of a dedicated cooling system constituted by a fan and a pump, and addition of a structure capable of enlarging the heat release area.

For example, PTL1 discloses a structure which includes a cooling system constituted by a heat pipe and a radiator. According to this technology, the motor and the radiator are connected with each other via a heat pipe so that heat transmitted via the heat pipe to the radiator can be dissipated from the radiator to the air.

CITATION LIST

Patent Literature

PTL1: JP-A-2004-50990

SUMMARY OF INVENTION

Technical Problem

For some types of HEV, EV and the like, however, only enlargement of the cooling area is insufficient. A radiator added for heat release performs a preferable heat release function only when heat reaches the radiator. However, for the HEV and the EV requiring short-term intermittent operation, there is a possibility that the temperature of the motor rises before the radiator receives heat, and reaches an allowable limit.

One of methods capable of avoiding these circumstances is to raise the heat capacity of the motor, for example. However, this method increases the weight of the motor, thereby deteriorating the fuel consumption rate. Similarly, in the case of the structure which includes the heat pipe and the radiator as disclosed in PTL1, the necessity for the heat release area of the radiator sufficient for the motor loss also increases the weight.

Solution to Problem

A first aspect of the invention is directed to a gear-integrated electric motor provided with a motor generating a driving force by input of electricity, a gear mechanism converting the driving force of the motor, and a housing containing the motor and the gear mechanism, and used in a horizontal position in which a motor shaft and a gear output shaft become substantially horizontal. The gear-integrated electric motor includes at least one heat pipe which has an evaporation portion disposed in a motor area of the housing, and a condensation portion disposed in a gear mechanism area of the housing and higher than the evaporation portion with respect to the vertical direction in the horizontal position.

According to a second aspect of the invention, it is preferable that the heat pipe in the gear-integrated electric motor according to the first aspect is embedded in a component of the housing.

According to a third aspect of the invention, it is preferable that a connection portion between the evaporation portion and the condensation portion of the heat pipe in the gear-integrated electric motor according to the first aspect is disposed between the motor shaft and the gear output shaft.

According to a fourth aspect of the invention, it is preferable that oil such as lubricant is contained in the motor area of the housing in the gear-integrated electric motor according to the first aspect, and that the evaporation portion is disposed within or in the vicinity of the area where the oil remains.

According to a fifth aspect of the invention, it is preferable that at least a part of the evaporation portion in the gear-integrated electric motor according to the first aspect contacts a stator of the motor.

According to a sixth aspect of the invention, it is preferable that the gear-integrated electric motor according to the first aspect includes a plurality of the heat pipes. In this case, the plural heat pipes include first heat pipes the condensation portion of each of which is disposed in a first area within the gear mechanism area and close to the motor, and second heat pipes the condensation portion of each of which is disposed in a second area within the gear mechanism area and farther away from the motor than the position of the first area with respect to the motor.

According to a seventh aspect of the invention, it is preferable that a part containing the condensation portion of the heat pipe, and a part containing the evaporation portion of the heat pipe in the gear-integrated electric motor according to the first aspect are embedded in a component of the housing such that these parts become parallel with the motor shaft.

An eighth aspect of the invention is directed to an electric vehicle which includes: the gear-integrated electric motor according to the first aspect, wherein the gear-integrated electric motor is mounted on the electric vehicle in the horizontal position; and a running mechanism which allows running of the vehicle by a driving force generated via the gear output shaft of the gear-integrated electric motor.

According to a ninth aspect of the invention, it is preferable that an angle of the extension direction of the heat pipe with respect to the horizontal direction in the electric vehicle according to the eighth aspect is set larger than a maximum gradient angle required for the electric vehicle.

Advantageous Effects of Invention

According to the invention, cooling efficiency of a motor improves without weight increase.

BRIEF DESCRIPTION OF THE DRAWINGS

FIG. 8 illustrates a groove formed in an end bracket 8b, in which groove the heat pipe is embedded, wherein: FIG. 8(a) shows a curved groove 804; and FIG. 8(b) shows a linear groove 805.

FIG. 9 illustrates the heat pipe 3 provided within a cavity 806 formed in the housing main body 8a.

DESCRIPTION OF EMBODIMENTS

Embodiments according to the invention are hereinafter described with reference to the drawings. Discussed in the following embodiments is a motor according to the invention included in a hybrid-type electric vehicle (HEV) as a typical example. However, applications of the invention are not limited to this example.

—First Embodiment—

Figure 1:
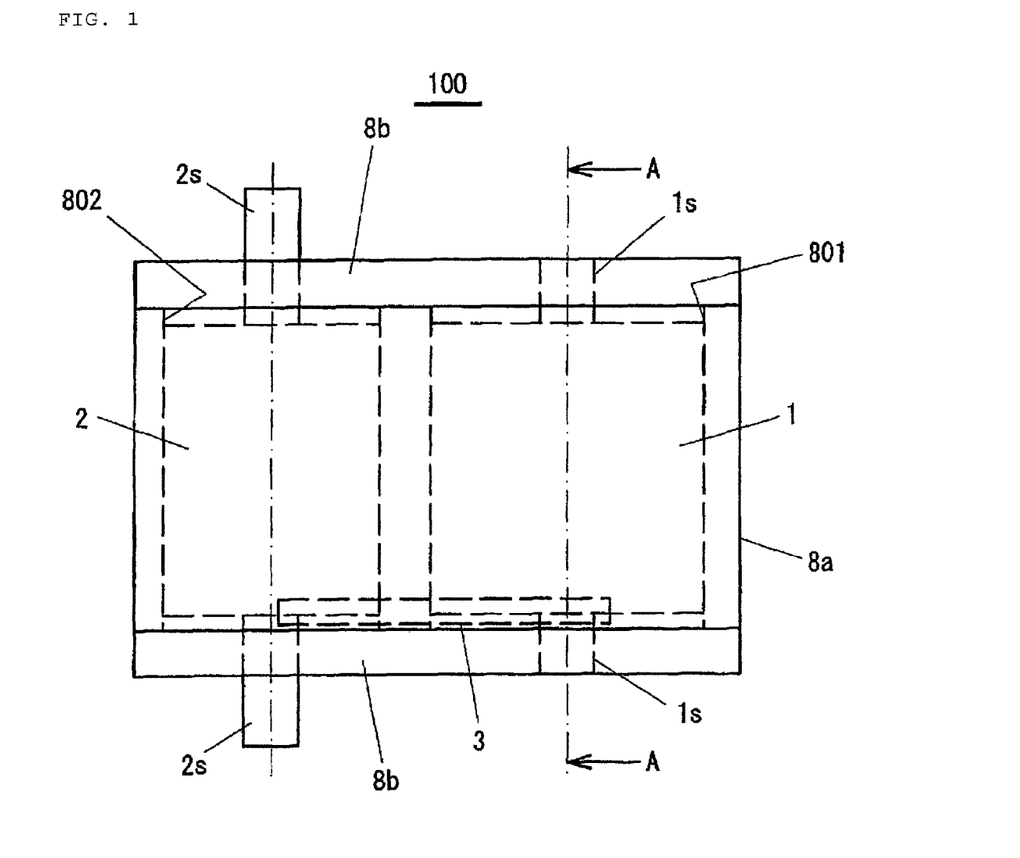
FIG. 1 is a plan view of a gear-integrated electric motor 100.
Figure 2:
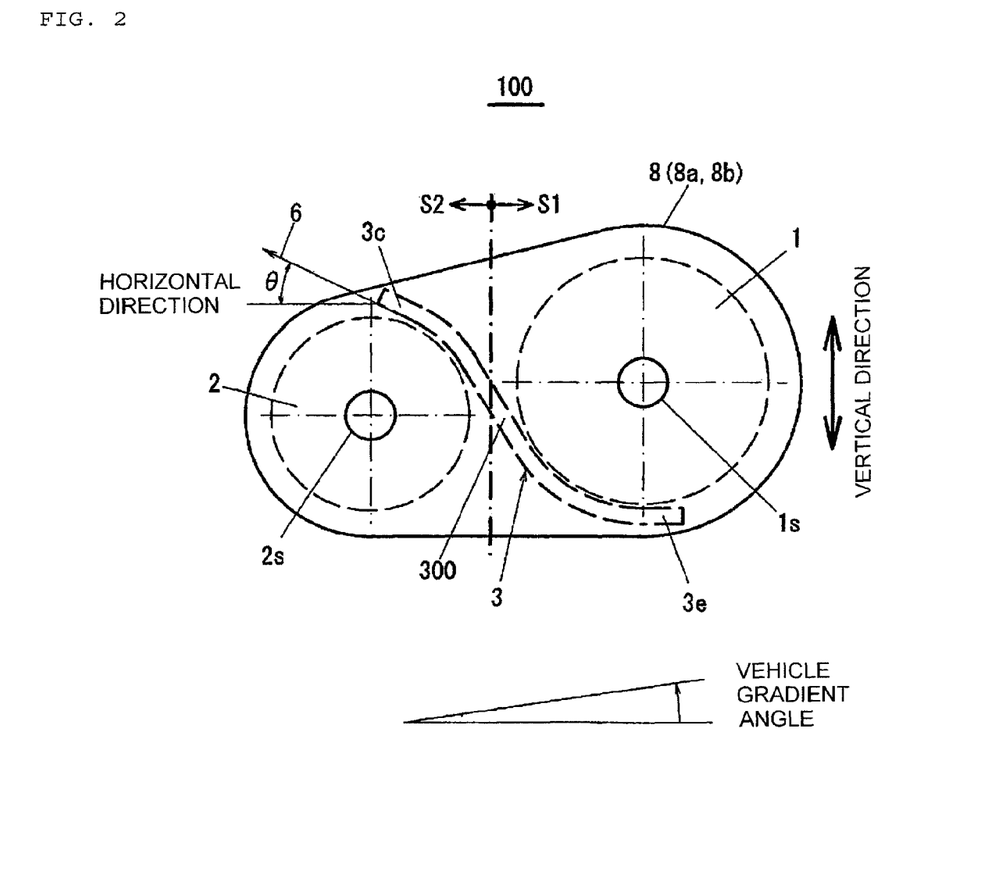
FIG. 2 is a side view of the gear-integrated electric motor 100.

FIGS. 1 through 4 illustrate a gear-integrated electric motor according to a first embodiment of the invention. FIG. 1 is a plan view of a gear-integrated electric motor 100. FIG. 2 is a side view of the gear-integrated electric motor 100.

Figure 13:
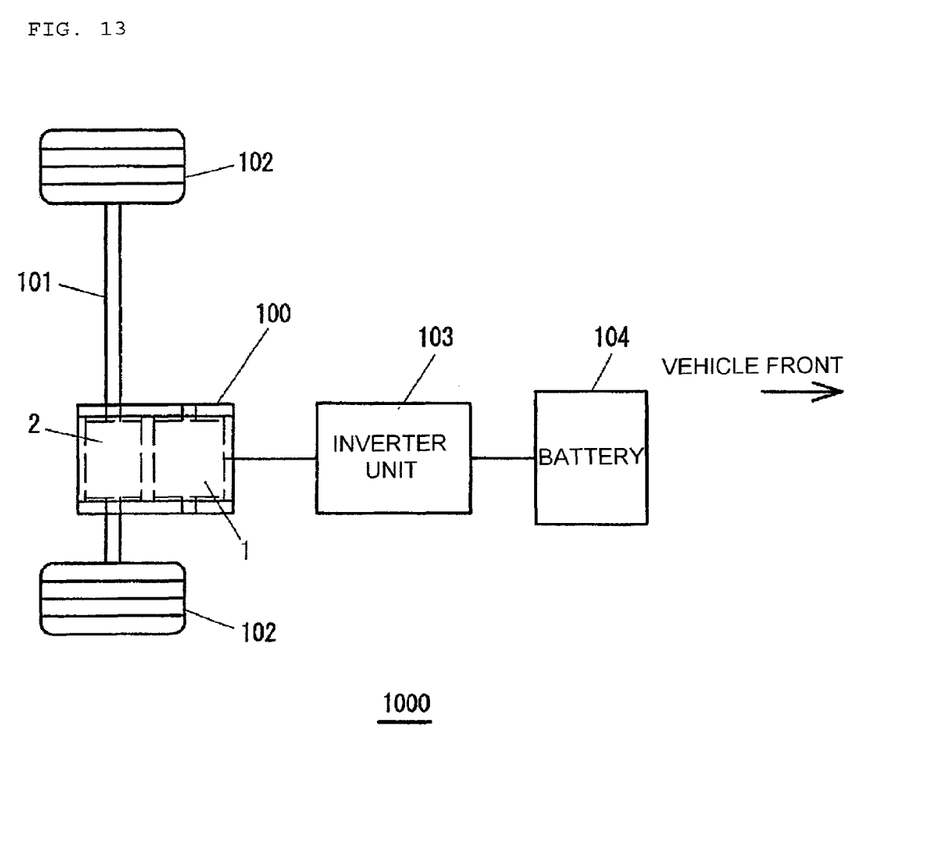
FIG. 13 illustrates a rear driving unit of a hybrid-type electric vehicle 1000 on which the gear-integrated electric motor 100 is mounted.

In the following description, the gear-integrated electric motor 100 used for rear driving of a hybrid-type electric vehicle (HEV) 1000 is discussed as an example as illustrated in FIG. 13. A rear axle 101 provided with rear wheels 102 is connected with a gear shaft 2s (described below) of the gear-integrated electric motor 100. The driving of a motor 1 of the gear-integrated electric motor 100 is controlled by an inverter unit 103 with supply of power from a battery 104 as a power source.

As illustrated in FIG. 2, the motor 1 and a gear mechanism 2 of the gear-integrated electric motor 100 are contained in a housing 8. The housing 8 in this embodiment includes a housing main body 8a having a motor housing portion 801 and a gear mechanism housing portion 802, and end brackets 8b covering the sides of the housing main body 8a. Power is supplied to the motor 1 from a not-shown power source unit. When the gear mechanism 2 is driven by the motor 1, the gear shaft 2s corresponding to an output shaft is rotated. The gear shaft 2s gives a driving force to a rear side axle of a vehicle, for example. A motor shaft is designated by a reference number "1s". A heat pipe 3 is equipped in the housing main body 8a.

Figure 3:
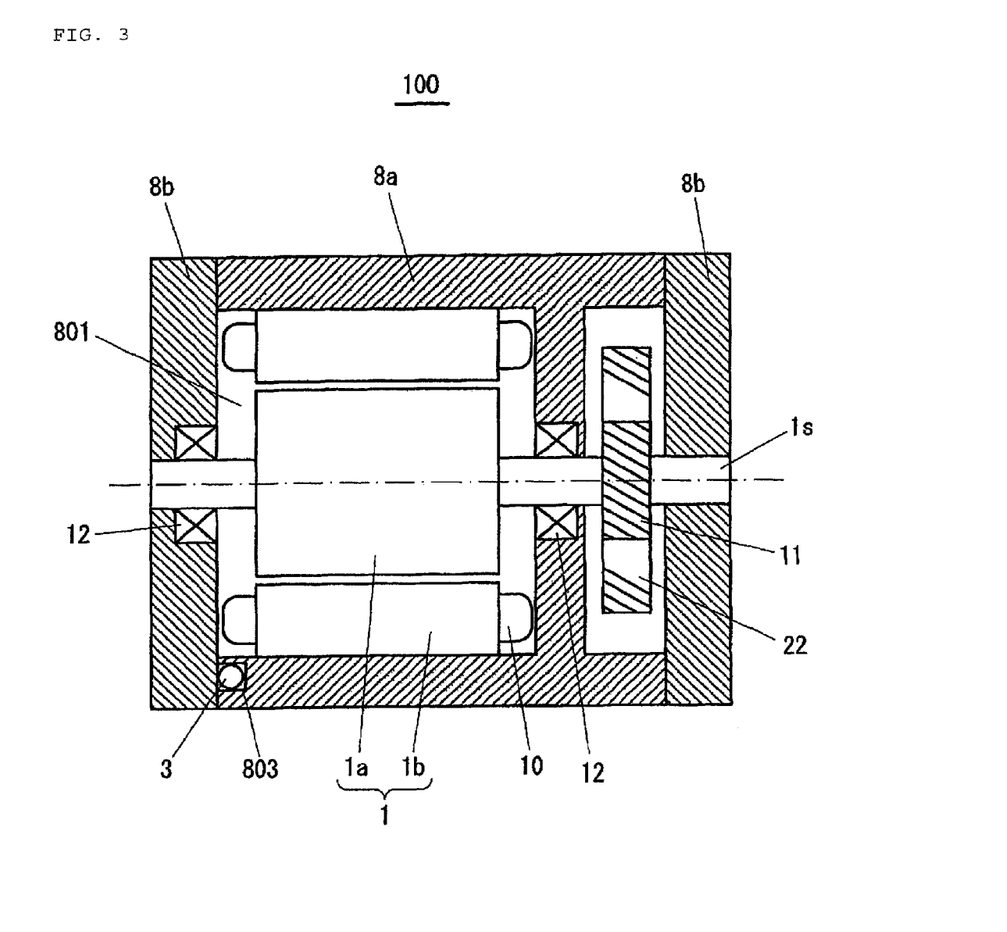
FIG. 3 is a cross-sectional view taken along a line A-A in FIG. 1.

FIG. 3 illustrates a cross section taken along a line A-A in FIG. 1. The motor 1 is provided within the motor housing portion 801. A motor stator 1b to which a winding 10 is attached is fixed to the inside of the cylindrical motor housing portion 801 by press fit or other methods. A motor rotor 1a is rotatably provided inside the motor stator 1b. The motor shaft 1s of the motor rotor 1a is supported by bearings 12 equipped in the housing main body 8a and the end brackets 8b. A gear 11 fixed to the motor shaft 1s engages with a gear 22 included in the gear mechanism 2. The gear mechanism 2 has a plurality of gears.

Figure 4:
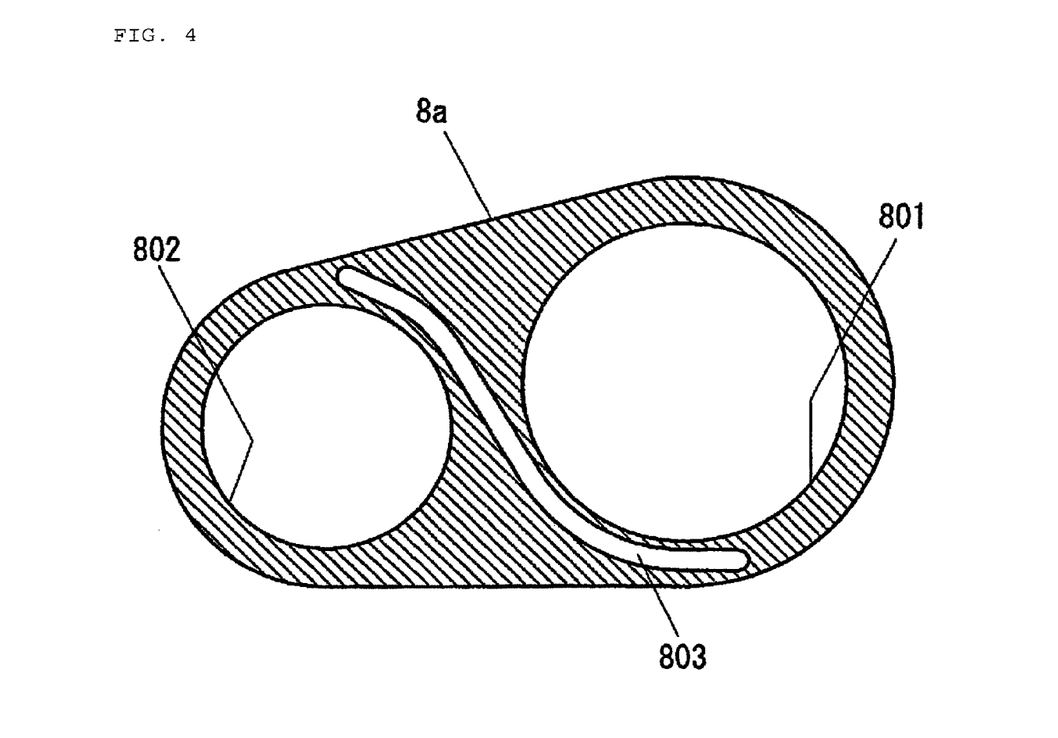
FIG. 4 illustrates a housing main body 8a provided with a groove 803 in which a heat pipe 3 is embedded.

FIG. 4 illustrates an area of the housing main body 8a where the heat pipe is provided. As noted above, the housing main body 8a has the motor housing portion 801 which houses the motor 1, and the gear mechanism housing portion 802 which houses the gear mechanism 2. Each of the housing portions 801 and 802 has various types of structures such as ribs for positioning the motor 1 and the gear mechanism 2. However, FIG. 4 shows only the general configuration of the housing main body 8a, and does not illustrate the detailed structures of the housing portions 801 and 802. A groove 803 in which the heat pipe 3 is embedded is formed in the side surface of the housing main body 8a.

As illustrated in FIG. 2, an evaporation portion 3e of the heat pipe 3 is disposed in a motor area S1 (near the motor 1) of the housing 8, while a condensation portion 3c of the heat pipe 3 is disposed in a gear mechanism area S2 (near the gear mechanism 2) of the housing 8. Furthermore, a connection portion 300 connecting the evaporation portion 3e and the condensation portion 3c is provided between the motor shaft 1s and the gear shaft 2s. The heat pipe 3 is a pipe-shaped container into which working fluid is sealed as fluid in a gas-liquid two-phase condition. According to this embodiment, the heat pipe 3 is a gravity type heat pipe which circulates the working fluid by utilizing gravity. Thus, the heat pipe 3 is attached such that the condensation portion 3c is located higher than the evaporation portion 3e with respect to the vertical direction of the gear-integrated motor 100. The heat pipe 3 is fixed to the groove 803 by calking, welding, soldering, or other methods.

When one end of the heat pipe 3 is heated with the other end thereof cooled, the working fluid evaporates on the heated side (evaporation portion 3e). As a result, vapors thus generated reach the cooled side and condense on the cooled side (condensation portion 3c). Then, condensed liquid thus produced flows through the wall surface of the container and again returns to the heated side (evaporation portion 3e). Heat can be transmitted from the evaporation portion 3e to the condensation portion 3c by repetition of the circulation and phase change of the working fluid. The evaporation portion 3e is located lower than the condensation portion 3c so that the condensed liquid can circulate toward the evaporation portion 3e by gravity.

Generally, a loop heat pipe, a dream pipe (oscillating heat pipe), or other types of pipe are known as heat pipes imposing no limitation on the positional relationship between the condensation portion 3c and the evaporation portion 3e. However, the heat pipe utilizing gravity can transmit a far greater amount of heat per heat pipe cross-sectional area than the heat amount transmitted by the heat pipes of these types. Thus, the gravity type heat pipe is more suited for HEVs and EVs whose component mounting space is considerably limited. It is possible, of course, to employ the loop heat pipe and the dream pipe for the heat pipe 3.

Figure 5:
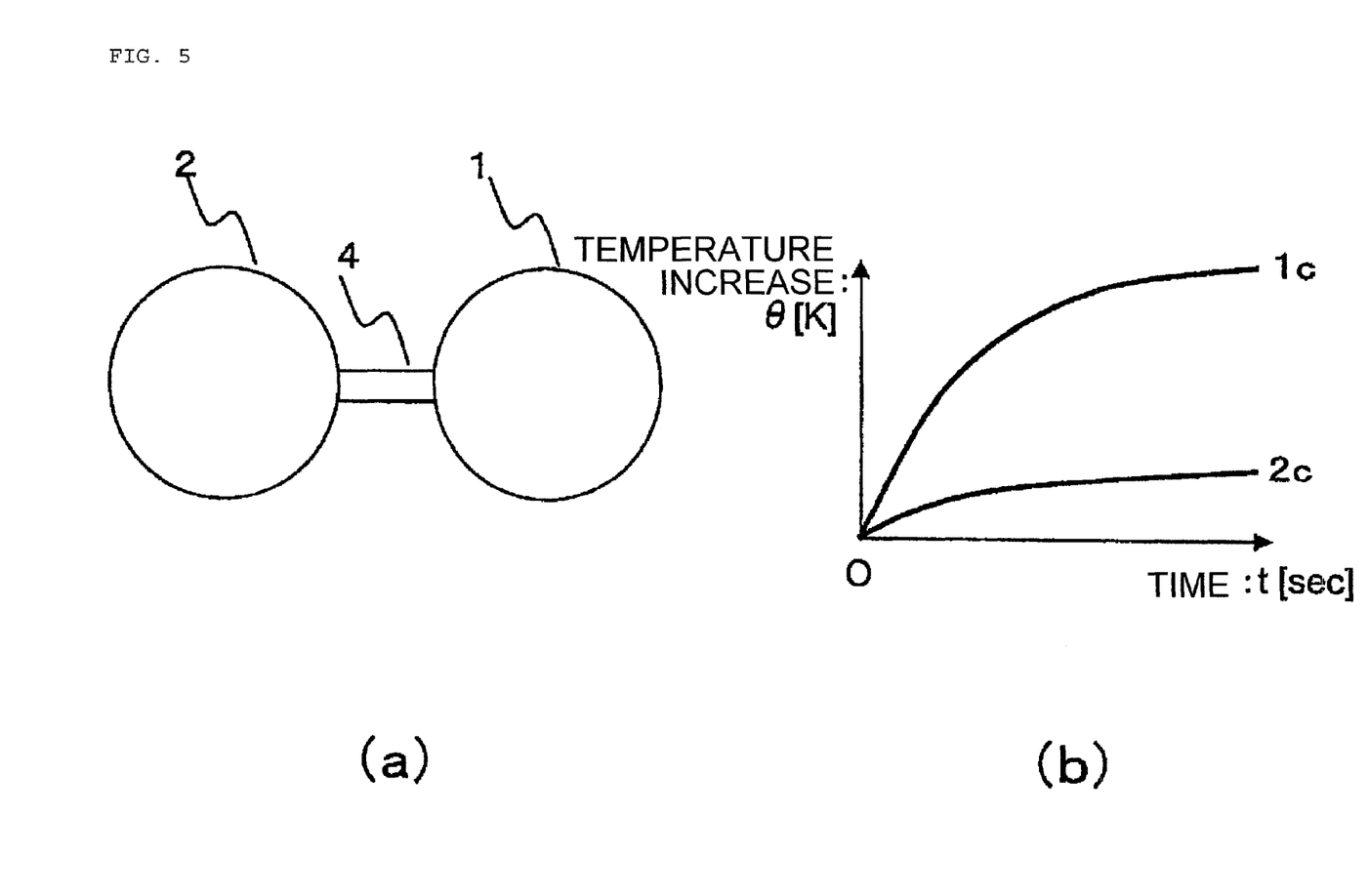
FIG. 5 shows a thermal relationship between a motor 1 and a gear mechanism 2 according to a gear-integrated motor in the related art.
Figure 6:
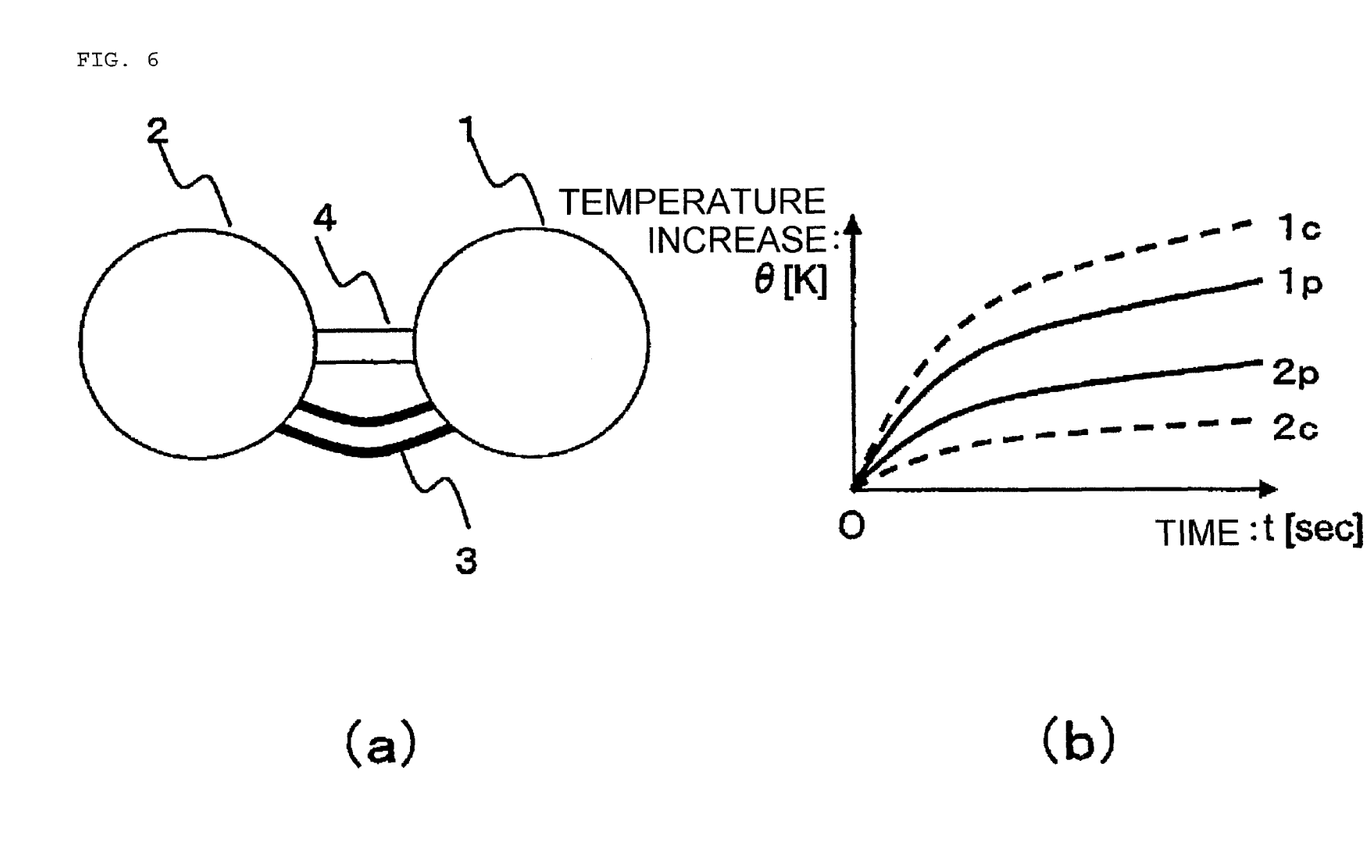
FIG. 6 shows a thermal relationship between the motor 1 and the gear mechanism 2 according to this embodiment.

FIGS. 5 and 6 schematically show the thermal relationship between the motor 1 and the gear mechanism 2. FIG. 5 corresponds to the thermal relationship in a gear-integrated motor in the related art, while FIG. 6 corresponds to the thermal relationship in the gear-integrated motor in this embodiment. The gear-integrated motor shown in FIG. 5 does not have the heat pipe 3. Thus, the thermal connection between the motor 1 and the gear mechanism 2 in this motor is made only by the housing 8.

FIG. 4 illustrates the general structure of the housing main body 8a in such a manner that a space other than the motor housing portion 801, the gear mechanism housing portion 802, and the groove 803 is filled with metal components. In practice, however, the thickness of the housing main body 8*a* is reduced to the smallest possible length so as to decrease the weight. Moreover, a cavity or the like is produced in a space between the motor housing portion 801 and the gear mechanism housing portion 802 for reduction of the weight.

Accordingly, while the housing 8 in the related art combines the gear-integrated motor into one body in structure, no consideration is given to the thermal integration between the temperatures of the motor 1 and the gear mechanism 2. In this case, thermal resistance between the motor 1 and the gear mechanism 2 does not decrease. FIG. 5(*a*) shows a thermal structure 4 corresponding to the thermal structure of the housing 8 of this type. As can be seen from the figure, the motor 1 and the gear mechanism 2 are thermally connected via the thermal structure 4.

FIG. 5(*b*) illustrates the general idea of the temperature hysteresis of the gear-integrated motor shown in FIG. 5(*a*). According to this structure, the thermal integration is insufficient and increases the thermal resistance of the thermal structure 4. In this case, only the heat capacity of the motor 1 works for a short-term load. Thus, as illustrated in FIG. 5(*b*), the temperature increase of the gear mechanism 2 (a curve 2*c*) is small, while the temperature increase of the motor 1 (a curve 1*c*) is large.

According to this embodiment, however, the motor 1 and the gear mechanism 2 are thermally connected by the heat pipe 3 as well as by the thermal structure 4 as illustrated in FIG. 6(*a*). In this case, the thermal resistance between the motor 1 and the gear mechanism 2 is considerably lower than in the case shown in FIG. 5(*a*). According to this structure, a part of the heat loss of the motor 1 is diffused into the ambient air via the gear box 2. As a result, the temperature of the gear mechanism 2 increases from the curve 2*c* to a curve 2*p* as illustrated in FIG. 6(*b*), wherefore the temperature of the motor 1 lowers from the curve 1*c* to a curve 1*p*. In other words, the thermal time constant of the cooling system of the motor 1 rises by utilization of the heat capacity of the gear mechanism 2, in which condition the temperature increase of the motor 1 at the time of the short-term load can be avoided.

Moreover, the structure in this embodiment does not require an additional radiator needed in the structure of PTL1, but requires only the heat pipe 3. Thus, the weight does not increase. When the heat pipe 3 is embedded in the housing 8 as illustrated in FIGS. 2 and 4, the weight of the heat pipe 3 is in some cases smaller than the weight of a housing material corresponding to a groove portion.

Figure 7:
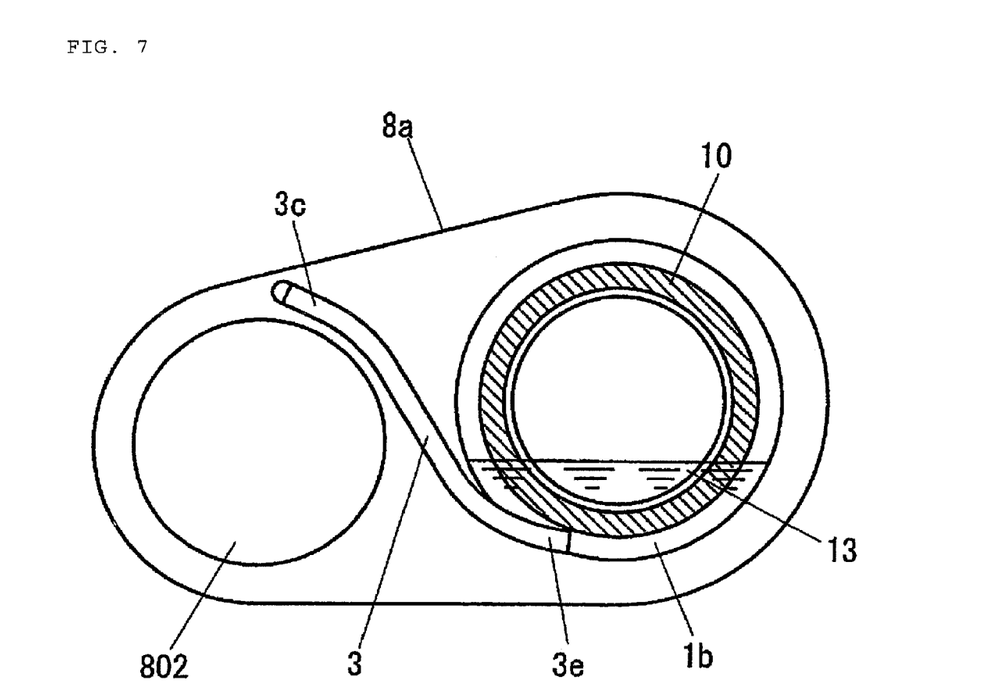
FIG. 7 illustrates a condition in which an evaporation portion 3e of the heat pipe 3 contacts an end surface of a stator core of a motor stator 1b.

The evaporation portion 3*e* of the heat pipe 3 provided in the housing main body 8*a* may be brought into contact with an end surface of a stator core of the motor stator 1*b* as illustrated in FIG. 7. This structure allows more effective transmission of heat from the motor 1 to the gear mechanism 2. Of course, the evaporation 3*e* may come into direct thermal contact with a stator coil 10 as long as this contact is allowed from the electrical and structural viewpoint. When an oil 13 is sealed into the gear box 2 or the motor 1 inside the housing 8, the evaporation portion 3*e* may be disposed within or close to the lower area of the motor 1 where the oil 13 remains so as to avoid increase in the temperature of the motor 1 around the area where the oil 13 remains, which temperature may become relatively higher than the temperature of other portions.

(Modified Example)

Figure 8:
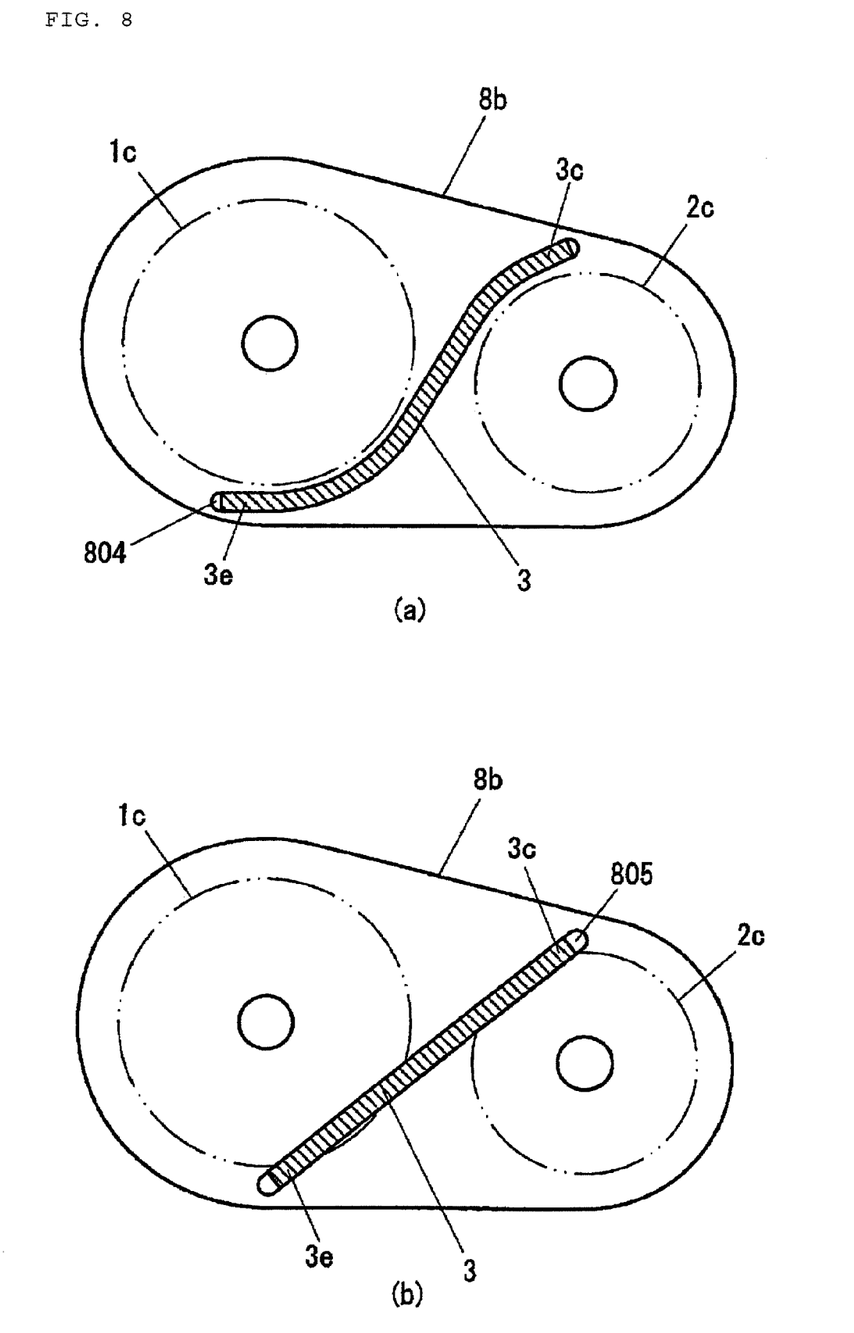

According to the embodiment described above, the heat pipe 3 is included in the housing main body 8*a*. However, the heat pipe 3 may be embedded in the end bracket 8*b* provided on each side of the housing main body 8*a* as illustrated in FIG. 8. FIGS. 8(*a*) and 8(*b*) show the inner surface side of the end bracket 8*b*. According to the example shown in FIG. 8(*a*), a groove 804 is formed in such an area not overlapping with an area 1*c* opposed to the motor 1 and an area 2*c* opposed to the gear mechanism 2. The heat pipe 3 is bended and embedded into the groove 804.

On the other hand, according to the example shown in FIG. 8(*b*), a linear groove 805 is formed so that the linear heat pipe 3 can be embedded in the groove 805. When embedded in the end bracket 8*b*, the heat pipe 3 opposed to the areas 1*c* and 2*c* indicated by two-dot chain lines does not interfere with the motor 1 and the gear mechanism 2. Thus, the arrangement shown in FIG. 8(*b*) is allowable.

Accordingly, when the heat pipe 3 is provided in the end bracket 8*b*, the heat generated from the motor 1 is transmitted to the housing main body 8*a*, the end bracket 8*b*, and the heat pipe 3 in this order. When oil is sealed into the gear box 2 or the motor 1 within the housing 8 for lubrication or cooling, it is expected that the oil enters a clearance between the heat pipe 3 and the housing 8 or between the heat pipe 3 and the end bracket 9 and increases the thermal contact between the heat pipe 3 and the housing 8 or between the heat pipe 3 and the end bracket 9. Additionally, a filler having high heat conductivity (such as resin) may be provided between the heat pipe 3 and the housing main body 8*a* or the motor stator 1*b* opposed to the heat pipe 3.

According to the structure of the heat pipe 3 embedded in the end bracket 8*b* as illustrated in FIG. 8, the heat pipe 3 can be equipped with little or no expansion of the external size of the gear-integrated electric motor 100, that is, the mounting volume of the motor 100. Moreover, it is expected that the structure of the embedded heat pipe 3 can reduce vibration of the heat pipe 3 more effectively than the structure of the heat pipe 3 not embedded. While the heat pipe 3 is embedded in the inner surface of the end bracket 8*b* in the example shown in FIG. 8, the heat pipe 3 may be embedded in the outer surface thereof.

Breakage of the heat pipe 3 may produce leakage of the working fluid contained therein and cause the heat pipe 3 inoperative. When embedded in the inner surface of the end bracket 8*b* as illustrated in FIG. 8, however, the heat pipe 3 surrounded by the end bracket 8*b* or the housing main body 8*a* can be protected from a flying object such as a flying stone. Thus, the cooling efficiency does not lower.

Figure 9:
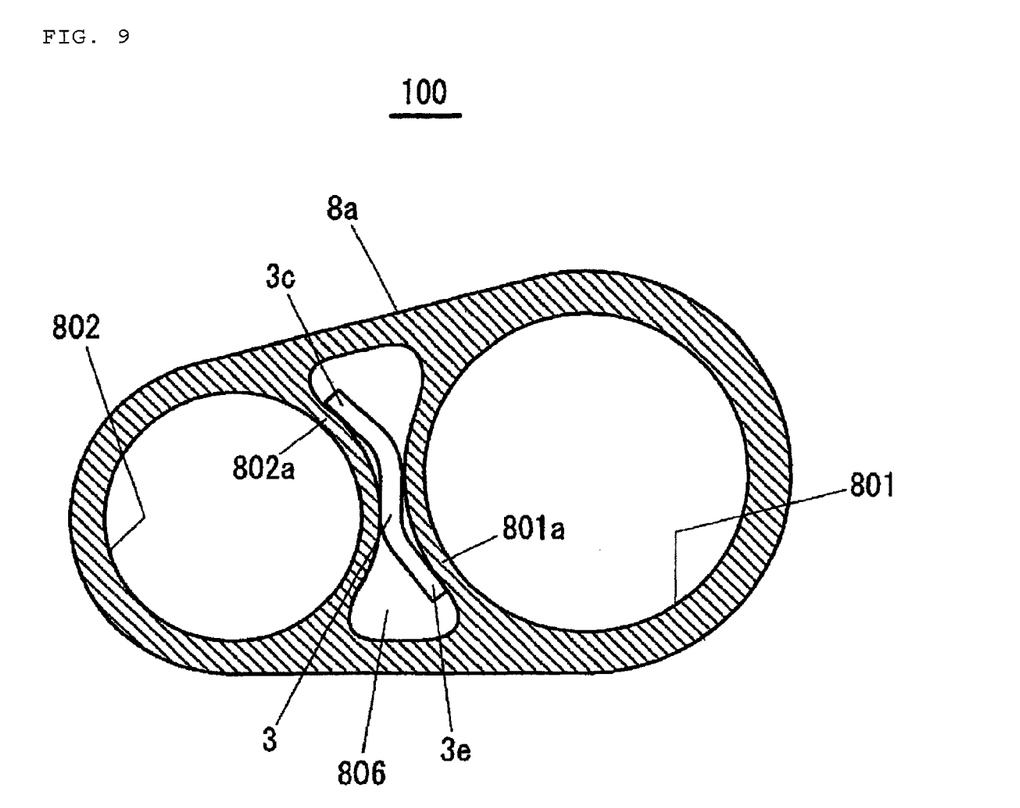

When the structure of the housing main body 8*a* has a shape shown in FIG. 9, the heat pipe 3 can be disposed not in the end surface of the housing main body 8*a* but in an inner area thereof. According to the example shown in FIG. 9, the heat pipe 3 is contained in a cavity 806 formed between the motor housing portion 801 and the gear mechanism housing portion 802. The evaporation portion 3*e* of the heat pipe 3 is fixed to a wall 801*a* of the motor housing portion 801, while the condensation portion 3*c* is fixed to a wall 802*a* of the gear mechanism housing portion 802.

As noted above, the working fluid of the heat pipe 3 utilizes gravity for circulation. Thus, when the heat pipe 3 is attached to the housing 8, an attachment position of the heat pipe 3 should be taken into severe consideration. Particularly, in the case of the gear-integrated electric motor mounted on a vehicle, one of bad road conditions requiring the driving force of the motor 1 is a slope with a rapid upward gradient. In this case, the heat pipe 3 is required to perform predetermined heat transmission even when inclined with the rapid gradient. More specifically, the condensation portion 3*c* is required to be located higher than the evaporation portion 3*e* in the vertical direction, and inclined to allow circulation of the working fluid at the time of inclination with the rapid gradient.

An angle θ shown in FIG. 2 referred to above is an angle formed by an axial vector 6 of the condensation portion 3c of the heat pipe 3 and the horizontal direction. When the angle θ is larger than a gradient angle required for the vehicle on which the gear-integrated electric motor 100 is mounted, an angle of the extension direction of the heat pipe 3 (angle formed by the heat pipe 3 and the horizontal direction) is larger than a maximum gradient angle, in which condition sufficient heat transmission performance of the heat pipe 3 can be secured. For example, when a gradient required for the vehicle is 20%, the heat pipe 3 is disposed such that the angle θ becomes 11.3° or larger.

Figure 10:
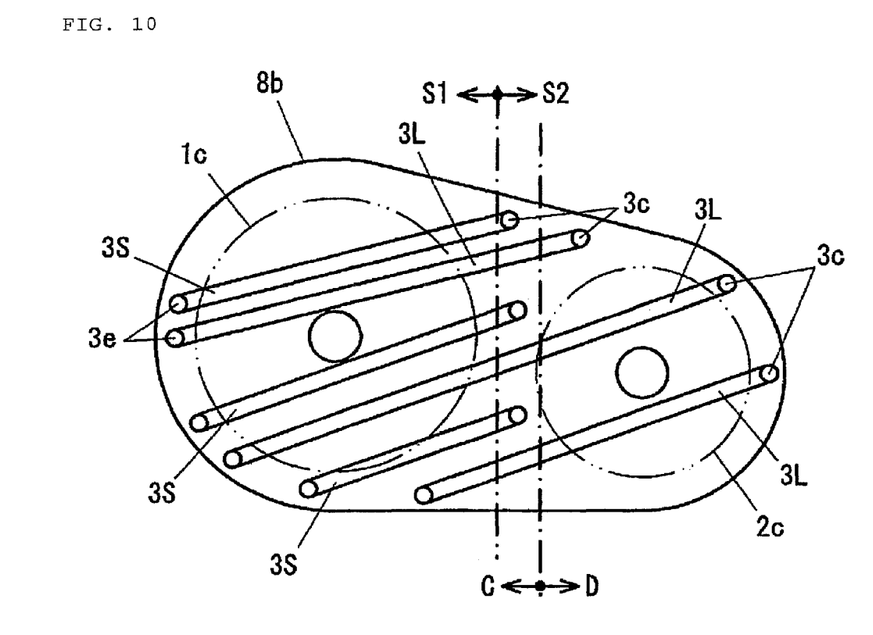
FIG. 10 illustrates heat pipes 3L and 3S provided in the end bracket 8b.
Figure 11:
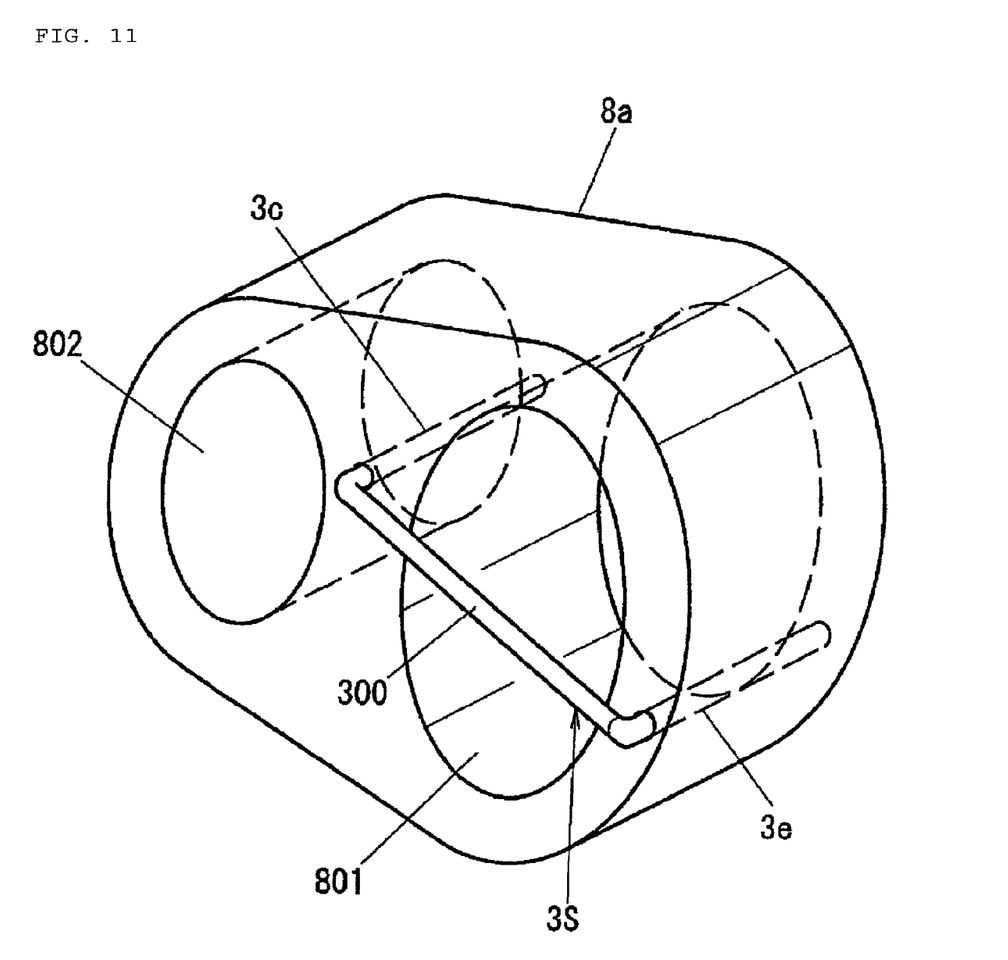
FIG. 11 illustrates the shape of the heat pipe 3S.

FIGS. 10 and 11 illustrate a second embodiment of the invention. According to the heat pipe 3 utilizing the working fluid, the working fluid solidifies when the temperature of the fluid becomes a melting point of the fluid or lower. In this case, circulation of the working fluid, and thus the heat transmission by the heat pipe 3 cannot be achieved. For example, water as a liquid typically used for the working fluid due to its capability of storing a large amount of latent heat freezes when the temperature becomes 0° C. or lower. On the other hand, one of the bad road conditions requiring the driving force of the motor 1 for the HEV or the EV is running on a snow road, a frozen slope, or other road surfaces which are slippery at the time of low temperature. The heat pipe 3 is required to achieve predetermined heat transmission performance even under these low-temperature conditions.

The second embodiment adopts the structure shown in FIGS. 10 and 11 to secure the sufficient performance of the heat pipe 3 at the time of low temperature. FIG. 10 illustrates the inner surface side of the end plate 8b (side opposed to the housing 8a). As can be seen from the figure, a plurality of heat pipes 3L and 3S are equipped in the inner surface of the end plate 8b.

FIG. 11 illustrates the shape of the heat pipe 3S. Though not shown in the figure, each of the heat pipes 3L has the same shape as that of the heat pipe 3S. The heat pipe 3S has a bended U shape. The connection portion 300 substantially in parallel with the end surface of the housing main body 8a is embedded in the not-shown inner surface of the end plate 8b (see FIG. 10). One end of the heat pipe 3S containing the evaporation portion 3e, and the other end containing the condensation portion 3c are folded toward the housing main body 8a with respect to the connection portion 300, and embedded in the housing main body 8a.

The method of bending the heat pipe 3 into a U shape and embedding the condensation portion 3c and the evaporation portion 3e in the housing main body 8a in the thickness direction thereof (axial direction of the motor 1) as illustrated in FIG. 11 is applicable to the structure shown in FIG. 2 and the structure shown in FIG. 4. The arrangement of the condensation portion 3c and the evaporation portion 3e embedded in the thickness direction of the housing main body 8a allows the entire area of the evaporation portion 3e to be located close to the motor 1 corresponding to a heat generating component, and the entire area of the condensation portion 3c to be located close to the gear mechanism 2.

The condensation portion 3c of the heat pipe 3S is disposed in an area of the housing main body 8a relatively close to the motor 1 (an area C on the left side of an alternate long and short dash line in FIG. 10). On the other hand, the condensation portion 3c of the heat pipe 3L is disposed in an area away from the motor 1 (an area D on the right side of the alternate long and short dash line in FIG. 10) when compared with the condensation portion 3c of the heat pipe 3S. According to the example shown in FIG. 10, the heat pipes 3L and 3S arranged differently from each other in this manner are equipped.

A case in which the heat pipes 3L and 3S in this arrangement are frozen at the time of low temperature is now discussed. When the motor 1 starts driving, the temperature of the condensation portion 3c of the heat pipe 3S disposed relatively close to the motor 1 becomes higher in accordance with generation of heat from the motor 1, and exceeds the melting point of the working fluid. As a result, the heat pipe 3S starts operation and transmits the heat of the motor 1 toward the gear mechanism 2. In this condition, the temperature difference between the gear mechanism 2 and the components of the motor stator 1b and the motor rotor 1a is large due to the low outside temperature. Thus, a sufficient cooling efficiency can be provided only by the heat pipe 3S whose condensation portion 3c is located close to the motor 1.

When the gear mechanism 2 side is heated by the continuous load of the motor 1, the working fluid of the heat pipe 3L whose condensation portion 3c is located away from the motor 1 gradually melts, finally allowing all the heat pipes 3L and 3S to perform their functions. During operation of both the heat pipes 3L and 3S, the heat transmission amount rapidly increases due to the larger temperature difference between both ends of the heat pipe 3L than that of the heat pipe 3S.

Accordingly, the structure in this embodiment has two types of heat pipes, i.e., the heat pipe 3S whose condensation portion 3c is located close to the motor 1 and the heat pipe 3L whose condensation portion 3c is located away from the motor 1, so as to secure the performance of the heat pipe 3 under the low-temperature condition. According to this structure, the heat pipe 3S functions immediately after the start of the motor under the low-temperature condition, whereafter the heat pipe 3L having higher heat transmission capability starts functioning with temperature increase of the gear mechanism 2 resulting from the operation of the heat pipe 3S.

Advantages similar to those of the structure shown in FIGS. 10 and 11 can be provided by changing components included in the working fluid in the heat pipe 3 rather than changing the arrangement of the condensation portion 3c. For example, the heat pipe 3 containing working fluid having a melting point lower than the ambient temperature (freezing point) such as a fluorine inert refrigerant may be used. Alternatively, the heat pipe 3 may be a variable conductance heat pipe into which helium or other gas inert and non-condensable within a working temperature range is sealed together with water as the working fluid may be used. It is also possible to employ a combination of heat pipes into which working fluids having melting points a, b, c, and others within the working temperature range are sealed, respectively, allowing decrease in the amount of heat transmission by the heat pipe 3 at the time of low outside temperature which expands the allowable temperature difference between the motor rotor 1a and the motor stator 1b.

Figure 12:
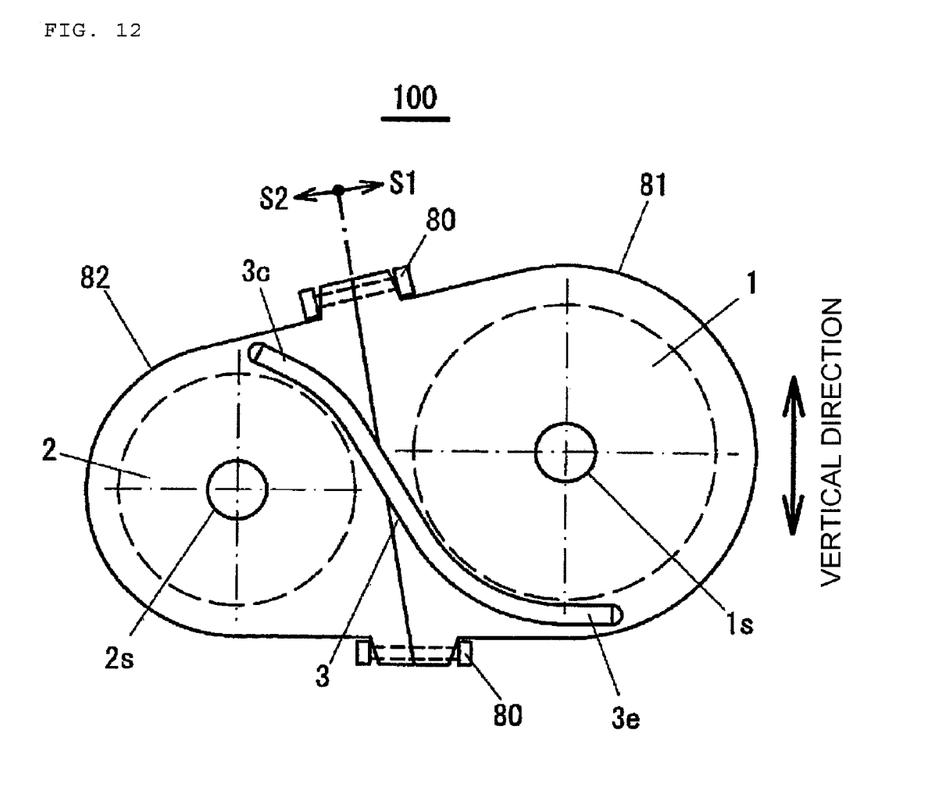
FIG. 12 illustrates the gear-integrated electric motor 100 containing a motor housing 81 and a gear mechanism housing 82 combined into one body via fasteners 80.

According to the respective embodiments described above, the motor 1 and the gear mechanism 2 are housed within the housing main body 8a However, the motor 1 and the gear mechanism 2 may be stored in separate housings as illustrated in FIG. 12. According to the example shown in FIG. 12, the motor 1 is housed in a motor housing 81, while the gear mechanism 2 is housed in a gear mechanism housing 82. The motor housing 81 and the gear mechanism housing 82 are combined into one body by fasteners 80. The heat pipe 3 is embedded on the outer peripheral sides of the motor housing 81 and the gear mechanism housing 82. This structure can improve the cooling efficiency similarly to the foregoing embodiments.

When the heat pipe 3 is frozen or broken, or positioned in such a condition that the condensed liquid of the working fluid cannot circulate as discussed above, the predetermined amount of heat transmission is difficult to achieve. Moreover, when the heat transmission amount exceeds a certain amount, the volume of circulation becomes smaller than the volume of evaporation, in which condition heat transmission becomes difficult. These problems can be overcome by detecting temperature abnormality based on monitoring of the temperature within the motor 1 by using a thermistor or the like. When the temperature abnormality is detected, overheat of the motor 1 can be avoided by controlling the motor 1 such that an output thereof decreases.

While the motor for the hybrid-type electric vehicle (HEV) as one type of electric vehicles has been discussed in the foregoing embodiments, the invention is applicable to other types of electric vehicles such as electric automobiles, electric railroad vehicles, and electrically powered construction machines, and industrial machines including a gear-integrated electric motor. Any of these applications can offer advantages similar to those of the foregoing embodiments by the arrangement of the heat pipe 3 between the gear mechanism 2 and the motor 1 in such a position that the evaporation portion 3e of the heat pipe 3 is located close to the motor and that the condensation portion 3c is located close to the gear mechanism 2, and also in such a position that the condensation portion 3c is disposed higher than the evaporation portion 3e. Moreover, while the arrangement of the motor 1 and the gear mechanism 2 such that the motor shaft is and the gear shaft 2s are disposed in parallel with each other has been discussed in the foregoing embodiments, the invention is applicable to a gear-integrated electric motor which disposes the motor 1 and the gear mechanism 2 such that the motor shaft is and the gear shaft 2s extend in the same direction.

The respective embodiments described herein may be practiced separately, or may be combined with each other, since the advantages of the respective embodiments can be provided separately or multiplied by each other. The invention is not limited to the foregoing embodiments but may be practiced otherwise as long as the characteristics of the invention can be offered.

While various embodiments and modified examples have been described herein, the invention is not limited to the teachings of these examples. Other modes possible within the scope of the technical spirit of the invention are included in the scope of the invention.

The disclosure of the following application to which this application claims priority is incorporated by reference herein:

Japanese Patent Application No. 2010-85120 (filed Apr. 1, 2010)

The invention claimed is:

1. A gear-integrated electric motor provided with a motor generating a
driving force by input of electricity, a gear mechanism converting the driving force of the motor, and a housing containing the motor and the gear mechanism, and used in a horizontal position, wherein a motor shaft and a gear output shaft become substantially horizontal, comprising:
at least one heat pipe that has an evaporation portion disposed in a motor area of the housing, and a condensation portion disposed in a gear mechanism area of the housing and higher than the evaporation portion with respect to the vertical direction in the horizontal position,
wherein
oil such as lubricant is contained in the motor area of the housing, and
the evaporation portion is disposed within or in the vicinity of an area where the oil remains.

2. The gear-integrated electric motor according to claim 1, wherein the heat pipe is embedded in a component of the housing.

3. The gear-integrated electric motor according to claim 1, wherein a connection portion between the evaporation portion and the condensation portion of the heat pipe is disposed between the motor shaft and the gear output shaft.

4. The gear-integrated electric motor according to claim 1, wherein at least a part of the evaporation portion contacts a stator of the motor.

5. A gear-integrated electric motor provided with a motor generating a
driving force by input of electricity, a gear mechanism converting the driving force of the motor, and a housing containing the motor and the gear mechanism, and
used in a horizontal position wherein a motor shaft and a gear output shaft become substantially horizontal, comprising:
a plurality of heat pipes, wherein each of the plurality of heat pipes has an evaporation portion disposed in a motor area of the housing, and a condensation portion disposed in a gear mechanism area of the housing and higher than the evaporation portion with respect to the vertical direction in the horizontal position,
wherein the plurality of heat pipes include first heat pipes, wherein the condensation portion of each of the first heat pipes is disposed in a first area within the gear mechanism area and close to the motor, and second heat pipes, wherein the condensation portion of each of the second heat pipes is disposed in a second area within the gear mechanism area and farther away from the motor than the position of the first area with respect to the motor.

6. The gear-integrated electric motor according to claim 1, wherein a part containing the condensation portion of the heat pipe, and a part containing the evaporation portion of the heat pipe are embedded in a component of the housing such that these parts become parallel with the motor shaft.

7. An electric vehicle, comprising:
the gear-integrated electric motor according to claim 1, wherein the gear-integrated electric motor is mounted on the electric vehicle in the horizontal position; and
a running mechanism that allows running of the vehicle by a driving force generated via the gear output shaft of the gear-integrated electric motor.

8. The electric vehicle according to claim 7, wherein an angle of the extension direction of the heat pipe with respect to the horizontal direction is set larger than a maximum gradient angle required for the electric vehicle.

* * * * *